Jan. 13, 1953     T. E. PARRISH     2,625,169
AUTOMATIC SHUTOFF DEVICE
Filed Oct. 12, 1950
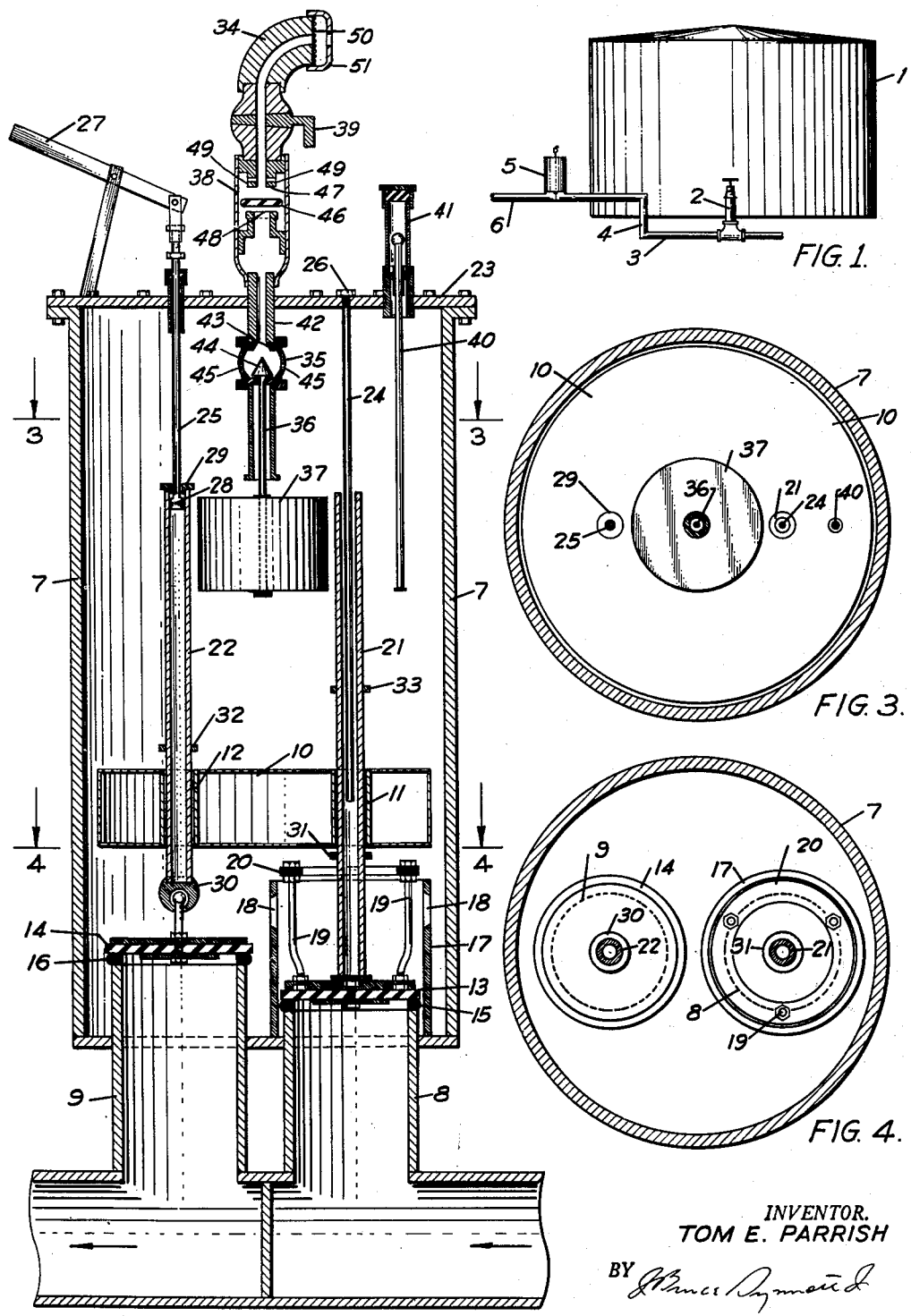
INVENTOR.
TOM E. PARRISH
ATTORNEY

Patented Jan. 13, 1953

2,625,169

UNITED STATES PATENT OFFICE 2,625,169

AUTOMATIC SHUTOFF DEVICE

Tom E. Parrish, Beaumont, Tex.

Application October 12, 1950, Serial No. 189,743

3 Claims. (Cl. 137—174)

The invention concerns an automatic shutoff device for use in connection with a battery of one or more tanks such as those commonly used in oil pipe line gathering systems. It is common practice to pump oil from two or more of such tanks at the same time, the draw-off lines from the several tanks being served by a common pipe line. Ordinarily the liquid level in the several tanks of the battery becomes equalized during pumping. A pipe line may be fed by a number of such batteries of tanks, taking suction on all of them at the same time. The shutoff device of the invention may be used to shut off the flow of liquid from a given tank or battery when the liquid level therein has dropped below a certain point, such, for example, as the point where the draw-off line enters the tank. At the same time the connection between the draw-off line and the pipe line is positively closed so that no air is admitted to the pipe line from the tank. The present application constituting a continuation in part of my prior co-pending application filed December 7, 1946, and bearing Serial No. 714,819, now Patent No. 2,570,372.

A number of devices intended to be used for the purpose described are now on the market, and others are disclosed in previously issued patents, but none of them are entirely satisfactory.

In my earlier patent, No. 2,489,461, dated November 29, 1949, I have described and claimed an automatic shutoff device for liquid conducting lines. The automatic shutoff device described in this application is an improvement over the one described in the patent referred to.

It is an object of the invention to provide an automatic shutoff device which is adapted to shut off the flow of liquid from a tank without permitting air to enter the pipe line from the tank. The presence of air in a pipe line destroys the suction and thus interferes with the pumping operation.

It is also an object of the invention to provide a float controlled shutoff valve which is fully automatic and is so designed that the float will rise and fall freely in response to fluctuations in liquid level and the valve will be properly seated.

Another object of the invention is to provide, in conjunction with an automatic shutoff device of the type described, means for preventing the flow of liquid in reverse direction from the shutoff device to the tank. Such an arrangement is desirable in order to prevent possible overflow of the tank by the flow of liquid thereto from another tank positioned at a higher elevation or having a higher liquid level.

A further object of the invention is to provide a float controlled shutoff valve in which the flow of liquid from the tank to the float chamber is utilized to lift the valve from its seat, thereby breaking the vacuum in the discharge line and permitting the float to rise and fall freely.

A further object of the invention is the method of controlling the level of liquid fluid in the tank or receptacle flowing through a shutoff device of the character described into a pipe line system.

The invention will be readily understood by referring to the following description and the accompanying drawing, in which:

Fig. 1 is a diagrammatic view in elevation showing one of a battery of tanks having its draw-off line connected to a header which may be connected also to other tanks of the battery (not shown), with the automatic shutoff device of the invention interposed between the header and the pipe line.

Fig. 2 is a sectional view in elevation of the shutoff device, showing the valve in closed position.

Fig. 3 is a sectional view taken on the line 3—3 of Fig. 2.

Fig. 4 is a sectional view taken on the line 4—4 of Fig. 2.

Referring to the drawing, the numeral 1 indicates a tank which is connected thru valved draw-off line 2 to a header 3. The tank 1 is situated above the ground, while the header 3 is buried below the surface. A riser 4 connects the header 3 with the shutoff device of the invention, which is indicated generally by the numeral 5. The shutoff device 5 is connected by a discharge pipe 6 to a pipe line (not shown).

The shutoff device 5 comprises a vertically disposed cylindrical casing 7 which is of relatively large diameter and provides a float chamber of considerable cross sectional area. An inlet pipe 8 and an outlet pipe 9 enter the casing 7 from the bottom and extend upwardly a short distance therefrom.

A cylindrical float 10 is received bodily within the casing 7. The diameter of the float 10 is only slightly less than the inside diameter of the casing 7. A pair of longitudinal openings 11 and 12 are formed in the body of the float 10, on opposite sides thereof, for use as guides as hereinafter described.

Valve discs 13 and 14 are provided for closing the upper end of the inlet pipe 8 and the outlet pipe 9. The valve discs 13 and 14 are made of a tough, resilient, rubber-like material such as neoprene, reenforced on each side with metal. The upper end of the outlet pipe 9 is slightly higher than that of the inlet pipe 8. Metal rings 15 and 16, which may be made of Monel or other suitable metal, are attached to the upper ends of the inlet pipe 8 and the outlet pipe 9 and function as valve seats.

The upper end of the inlet pipe 8 is surrounded by a cylindrical valve cage 17, the valve cage 17 being open at the top and being attached at its lower end to the bottom of the casing 7. A plurality of ports 18 are formed in the wall of the valve cage 17. A plurality of vertically disposed, wire-like guide members 19, which are attached at their lower ends to the valve disc 13 and at their upper ends to a wire-like ring 20, are receivable within the valve cage 17 and spaced about the wall thereof.

A pair of vertically disposed, tubular guides 21 and 22, each of which is movable longitudinally as hereinafter described, are aligned with the center lines of the inlet pipe 8 and the outlet pipe 9. The tubular guides 21 and 22 are inserted thru the openings 11 and 12 formed in the body of the float 10 and serve to maintain the float 10 in vertical alignment.

The upper end of the casing 7 is closed by a cover plate 23. A pair of vertically disposed guide rods 24 and 25, which slidably engage the upper ends of the tubular guides 21 and 22, are suspended from the cover plate 23 as hereinafter described. The guide rod 24 extends thru an opening formed in the cover plate 23 and a nut 26 is secured to the upper end thereof, above the cover plate 23. The guide rod 25 extends thru an opening formed in the cover plate 23, and the upper end thereof is secured to one end of a lever 27 which is mounted on the cover plate 23. A shoulder 28 is formed on the lower end of the guide rod 25 and is adapted to engage an internal shoulder 29 formed near the upper end of the tubular guide 22 whereby the tubular guide 22 may be lifted upon manipulating the lever 27. The lower end of the tubular guide 22 is connected, thru a ball joint 30, to the valve disc 14 whereby the valve disc 14 may be lifted from its seat by the action of the lever 27 on the guide rod 25 and the tubular guide 22. This arrangement is particularly useful when it is desired to drain the tank completely preparatory to cleaning.

The lower end of the tubular guide 21 rests freely upon the upper surface of the valve disc 13 when the valve disc 13 is seated. A shoulder 31 is formed on the tubular guide 21, below the float 10, and is adapted to engage the float 10 to lift it when the valve disc 13 is lifted from its seat by the action of liquid flowing thru the inlet pipe 8. A shoulder 32 is formed on the tubular guide 22, above the float 10, and is adapted to be engaged by the float 10 whereby the tubular guide 22 is raised, and the valve disc 14 is lifted from its seat, as the float 10 is raised by the action of the valve disc 13 on the tubular guide 21. A shoulder 33 is formed on the tubular guide 21, above the float 10, and is adapted to be engaged by the float 10 whereby the tubular guide 21 may be lifted out of the casing 7 along with the float 10 upon dismantling the apparatus.

A hollow valve body 35 is connected to the lower end of a tubular section 42 which is attached to the cover plate or flange 23 at the top of the casing 7. The valve body 35 having a beveled annular valve seat 43 interiorly thereof with an opening therethrough in communication with the opening in said tubular section 42. A valve stem 36 is slidably engaged through the lower portion of said valve body 35 and the lower portion of said valve stem 36 is connected to a float 37. The upper portion of the valve stem 36 is formed into a conical shaped valve head 44 adapted to seat in beveled annular valve seat 43 and to work within limits of seated and unseated position. A plurality of ports 45 through the side walls of said valve body 35 in communication with the interior of the casing 7 and the interior of said valve body 35. A hollow check valve body 38 is attached to the upper end of tubular section 42 with openings therethrough in register with the opening through said tubular section 42.

A plate valve 46 is made of rubber or other suitable material and is movable freely within limits interiorly of said hollow check valve body 38 between an upper valve seat 47 and a lower valve seat 48 formed interiorly of said hollow check valve body 38 and being of such dimensions to close the vertical openings through said upper and lower valve seats and yet be a loose sliding fit interiorly of said hollow check valve body 38 so as to work freely therein. A plurality of lateral ports 49—49 are formed above the upper valve seat 47, which ports are in communication with the vertical opening through said upper valve seat 47 and the interior of said hollow check valve body 38. A stopcock valve of usual construction is attached to the top of the check valve body 38 which has openings therethrough and is provided for emergency use only, and normally remains in open position. A vent pipe 34 is attached to the top of said stopcock valve 39 and is provided with screen 50 which is held in place by cage 51 to prevent insects and debris from stopping up the exit of the vent pipe 34. The diameter of said plate valve 46 is such that air and/or gas may by-pass said valve to enter ports 49—49, thence through stopcock valve 39 and thence through vent pipe 34 thereabove to the atmosphere when the air and/or gas fluid is being vented out of said casing 7, however, the plate valve 46 will prevent air from the atmosphere to enter said casing 7 when seated on valve seat 48 which occurs when the float controlled valve 44 seats on seat 43 in response to the liquid fluid present in the casing 7 during normal operations of the shutoff device.

A gauge rod 40 is slidably suspended from the cover plate 23 whereby it is movable longitudinally. The lower end of the gauge rod 40 is engaged by the float 10 as the liquid level in the casing 10 rises, and the position of the float 10 may be determined by observing the position of the gauge rod 40. The upper end of the gauge rod 40 is enclosed in a sight glass 41.

The operation of the automatic shutoff device of the invention is as follows:

With the tank 1 full of liquid and with the valved draw-off line 2 closed, and assuming that no liquid is flowing thru the header 3 from other tanks of the battery (not shown), the discharge pipe 6 will be sealed off from the shutoff device 5 by seating of the valve disc 14 on the valve seat 16 in the outlet pipe 9. Upon opening the valved draw-off line 2, liquid begins to flow thru the header 3 and the riser 4, and enters the casing 7 thru the inlet pipe 8. The valve disc 14 tends to remain seated due to the vacuum created by liquid moving thru the pipe line (not shown), but this tendency is at least partially overcome by the buoyancy of the float 10, which tends to lift the valve disc 14 from the valve seat 16. Moreover, the liquid entering the casing 7 thru the inlet pipe 8 acts upon the under side of the valve disc 13 to lift it from the valve seat 15. As the valve disc 13 is lifted from the valve seat 15 it abuts the lower end of the tubular guide 21, lifting it also, and the shoulder 31 on the tubular guide 21 contacts the float 10 in its ascent forcing the float 10 to contact the shoulder 32 on tubular guide 22 which forces the tubular guide 22 to lift the valve disc 14 from the valve seat 16, thereby breaking the vacuum which tends to maintain the valve disc 14 firmly seated. Thereafter the float 10 rises freely as the level of liquid in the casing 7 increases, and liquid is caused to flow thru the outlet pipe 9, the discharge pipe 6 and the pipe line (not shown). As the level of liquid in the casing 7 rises the float 10 rises therewith contacting float 37 to force the valve head 44 to seat in the valve seat 43 to seal off the vent, thereby stopping the flow of air or other gas from the casing 7 thru the vent pipe 34. In event of mechanical difficulty and float 10 does not rise with the entering liquid in the casing 7, then as the liquid level rises and contacts float 37 the float 37 will ascend with the liquid and force the valve head 44 to closed sealed-off position in the valve seat 43 thus the above construction provides a double safety factor insuring positive shutoff of the vent to prevent the oil or other liquid fluid from being lost through the vent. In the meantime a portion of the air or other gas will have been exhausted from the casing 7 by the rising level of liquid therein through the ports 45, hollow valve body 35, thence through tubular section 42, thence through check valve body 38 bypassing plate valve 46, thence through small lateral ports or orifices 49—49 and thence through the openings through stopcock valve 39 and the vent pipe 34 to the atmosphere. A considerable volume of air or other gas will remain in the upper portion of the casing 7 after the valve head 44 is seated, however, and the liquid level in the casing 7 will be determined by the degree to which this volume of air is compressed by action of the static head of liquid in the tank 1. It has been observed, by use of level gauges, that the float 10 ordinarily will not at any time be more than slightly immersed in the liquid flowing thru the casing 7. Thus the liquid in the casing 7 does not tend to be exhausted thru the vent pipe 34.

The valve head 44 normally remains seated while liquid is flowing thru the casing 7, thus preventing the passage of air or other gas to or from the casing 7 thru the vent pipe 34. On the other hand air or other gas may enter the casing 7 from the pipe line (not shown), thru the outlet pipe 9. This will increase the volume of air in the upper portion of the casing 7 and the liquid level will be forced downwardly and the float 10 and float 37 will be caused to lower slightly, thus unseating the valve 44 proportionately until a sufficient amount of air and/or gas is vented to the atmosphere whereupon the liquid level in the casing 7 rises again to automatically raise the floats 10 and 37 which react to close the valve 44. This permits air or other gas at stated intervals to be evacuated from the pipe line (not shown), which is desirable. Air or other gas will be exhausted from the casing 7 thru the vent pipe 34 until the pressure of the compressed air or other gas in the upper portion of the casing 7 is again balanced against the pressure created by the static head of liquid in the tank 1.

As the liquid level in the tank 1 approaches the liquid level in the casing 7, the compressed air above the float approaches atmospheric pressure. As the liquid level in the tank 1 continues to lower, a vacuum forms above the liquid level in the casing 7 and tends to hold the liquid at a higher level than the liquid level in the tank 1. Finally, as the liquid level in the tank 1 approaches the top of the draw-off line, a small amount of air enters the draw-off line and the casing 7 from the tank 1, breaking the vacuum above the liquid level in the casing 7, and causes the valve 14 to be seated quickly.

The valve disc 13 is adapted to close the inlet pipe 8 and to prevent the flow of liquid in reverse direction from the casing 7 to the tank 1. This arrangement prevents overflow of the tank 1 due to the flow of liquid to the tank 1 from another tank to which it may be connected, and eliminates the expense of a seperate check valve for this purpose. Thus when pumping simultaneously from tanks positioned at different elevations, or having different liquid levels, the tank positioned at the highest elevation, or having the highest liquid level, automatically is pumped out of before tanks having lower liquid levels or positioned at lower elevations, the levels in the several tanks eventually being equalized.

The invention may be modified in various ways without departing from the spirit and scope thereof.

I claim:

1. An automatic shutoff device for fluid conducting lines comprising a vertically disposed cylindrical casing, an inlet pipe and an outlet pipe connected to the bottom of the casing and extending upwardly a short distance therefrom, valve seats in the upper ends of the inlet pipe and the outlet pipe, valve discs adapted to be seated on the valve seats, a cylindrical valve cage surrounding the upper end of the inlet pipe and attached at its lower end to the bottom of the casing, the valve cage being open at the top and a plurality of ports being formed in the wall thereof, a valve guide received within the valve cage and attached to the adjacent valve disc, a cylindrical float received bodily within the casing, a pair of longitudinal openings being formed in the body of the float on opposite sides thereof, a pair of vertically disposed tubular guides aligned with the center lines of the inlet pipe and the outlet pipe, the tubular guides being movable longitudinally and being loosely inserted thru the openings in the body of the float, the lower end of one of the tubular guides resting freely upon the upper surface of the valve disc in the inlet pipe when the valve disc is seated, the lower end of the other tubular guide being connected thru a ball joint to the valve disc in the outlet pipe, a guide rod rigidly secured at its upper end to the top of the casing and slidably engaging the upper end of the first mentioned tubular guide, a second guide rod slidably engaging the upper end of the last mentioned tubular guide and suspended from the top of the casing, a shoulder being formed on the first mentioned tubular guide below the float and a shoulder being formed on the last mentioned tubular guide above the float, a vent pipe extending thru the top of the casing, and a float operated valve in the vent pipe.

2. An automatic shutoff device for fluid conducting lines comprising a vertically disposed cylindrical casing, an inlet pipe and an outlet pipe connected to the bottom of the casing and extending upwardly a short distance therefrom, valve seats in the upper ends of the inlet pipe and the outlet pipe, valve discs adapted to be seated on the valve seats, a cylindrical valve cage surrounding the upper end of the inlet pipe and attached at its lower end to the bottom of the casing, the valve cage being open at the top and a plurality of ports being formed in the wall thereof, a valve guide received within the valve cage and attached to the adjacent valve disc, a cylindrical float received bodily within the casing, a pair of longitudinal openings being formed in the body of the float on opposite sides thereof, a pair of vertically disposed tubular guides aligned with the center lines of the inlet pipe and the outlet pipe, the tubular guides being movable longitudinally and being loosely inserted thru the openings in the body of the float, the lower end of one of the tubular guides resting freely upon the upper surface of the valve disc in the inlet pipe when the valve disc is seated, the lower end of the other tubular guide being connected thru a ball joint to the valve disc in the outlet pipe, a guide rod rigidly secured at its upper end to the top of the casing and slidably engaging the upper end of the first mentioned tubular guide, a second guide rod slidably engaging the upper end of the last mentioned tubular guide and suspended from the top of the casing, a shoulder being formed on the first mentioned tubular guide below the float and a shoulder being formed on the last mentioned tubular guide above the float, a vent pipe extending thru the top of the casing, a valve housing connected to the vent pipe, a valve seat and a valve in the valve housing, a valve stem connected at its upper end to the valve, and a float connected to the lower end of the valve stem.

3. An automatic shutoff device for fluid conducting lines comprising a vertically disposed cylindrical casing, an inlet pipe and an outlet pipe connected to the bottom of the casing and extending upwardly a short distance therefrom, valve seats in the upper ends of the inlet pipe and the outlet pipe, valve discs adapted to be seated on the valve seats, a cylindrical valve cage surrounding the upper end of the inlet pipe and attached at its lower end to the bottom of the casing, the valve cage being open at the top and a plurality of ports being formed in the wall thereof, a valve guide received within the valve cage and attached to the adjacent valve disc, a cylindrical float received bodily within the casing, a pair of longitudinal openings being formed in the body of the float on opposite sides thereof, a pair of vertically disposed tubular guides aligned with the center lines of the inlet pipe and the outlet pipe, the tubular guides being movable longitudinally and being loosely inserted thru the openings in the body of the float, the lower end of one of the tubular guides resting freely upon the upper surface of the valve disc in the inlet pipe when the valve disc is seated, the lower end of the other tubular guide being connected thru a ball joint to the valve disc in the outlet pipe, a guide rod rigidly secured at its upper end to the top of the casing and slidably engaging the upper end of the first mentioned tubular guide, a second guide rod slidably engaging the upper end of the last mentioned tubular guide and extending thru an opening in the top of the casing, a shoulder being formed on the lower end of the second guide rod and an internal shoulder being formed on the lower end of the last mentioned tubular guide, the upper end of the second guide rod being secured to one end of a lever mounted on the top of the casing, a shoulder being formed on the first mentioned tubular guide below the float and a shoulder being formed on the last mentioned tubular guide above the float, a vent pipe extending thru the top of the casing, a valve housing connected to the vent pipe, a valve seat and a valve in the valve housing, a valve stem connected at its upper end to the valve, and a float connected to the lower end of the valve stem.

TOM E. PARRISH.

REFERENCES CITED

The following references are of record in the file of this patent:

UNITED STATES PATENTS

| Number | Name | Date |
|---|---|---|
| 1,183,513 | Ahola | May 16, 1916 |
| 2,210,751 | Cronkhite | Aug. 6, 1940 |
| 2,292,509 | Carson | Aug. 11, 1942 |
| 2,322,304 | Montgomery | June 22, 1943 |
| 2,387,858 | Russel | Oct. 30, 1945 |
| 2,456,170 | Bennett | Dec. 14, 1948 |
| 2,489,461 | Parrish | Nov. 29, 1949 |
| 2,496,518 | Candler | Feb. 7, 1950 |